United States Patent
Mohon

[11] 3,911,598
[45] Oct. 14, 1975

[54] LASER TYPE WEAPON FIRE SIMULATION SYSTEM

[75] Inventor: Windell N. Mohon, Winter Park, Fla.

[73] Assignee: The United States of America as represented by the Secretary of the Navy, Washington, D.C.

[22] Filed: May 16, 1974

[21] Appl. No.: 470,416

[52] U.S. Cl. ................................. 35/25; 273/105.1
[51] Int. Cl.$^2$ .......................................... F41G 3/26
[58] Field of Search ....... 35/25; 350/3.5; 273/101.1, 273/105.1

[56] References Cited
UNITED STATES PATENTS

| | | | |
|---|---|---|---|
| 3,243,896 | 4/1966 | Immarco et al. | 35/25 |
| 3,257,741 | 6/1966 | Cameron et al. | 35/25 |
| 3,515,452 | 6/1970 | Pole | 350/3.5 |
| 3,633,988 | 1/1972 | Farrar | 350/3.5 |
| 3,657,826 | 4/1972 | Marshall et al. | 35/25 |
| 3,664,722 | 5/1972 | Kazuo Kiji et al. | 350/3.5 |
| 3,811,204 | 5/1974 | Marshall et al. | 35/25 |

OTHER PUBLICATIONS
"Holography" by T. Smith — American Cinematographer, Nov. 1971.

*Primary Examiner*—John H. Wolff
*Attorney, Agent, or Firm*—Richard S. Sciascia; John W. Pease

[57] ABSTRACT

A laser type weapon fire simulation system in which a laser type weapon simulator capable of producing a laser beam when fired is combined with a holographic means capable of producing a three dimensional virtual image of a target and with a detector screen means to provide the effect of realism in firing at a three dimensional target and obtaining an immediate visual score. The invention in a further aspect contemplates the use of a holographic lens and the provision of projector means to add a background scene to the target so that both may be viewed simultaneously and further by provision of means for moving film and/or holograms introduces motion in either or both the virtual image and the background scene.

7 Claims, 10 Drawing Figures

3,911,598

LASER TYPE WEAPON FIRE SIMULATION SYSTEM

BACKGROUND OF THE INVENTION

The invention relates to the fields of simulation and weapon fire training and in particular to laser type weapon fire training and target systems with visual score indicator means.

There are two main conventional methods of providing laser weapon trainer systems. One method involves the use of a retroreflective material affixed to an outline of a target such that when a weapon affixed laser is fired at the target the trainee observes a flash of light returning from the target when he has scored a hit. A second method utilizes a laser beam detector or detectors on a target outline to sense the laser beam when a hit has been scored and to record the hit by means of an audio, visual or counter means actuated from the sensor.

One disadvantage of the prior art systems is the fact that for classroom teaching the target is presented in two dimensional form. An advantage would be obtained if the trainee were provided with a more realistic target for training in the use of the weapon by the introduction of a target or targets of three dimensional aspect and the aspect of moving from one view point to another and discovering a target hidden behind an obstacle or first target.

SUMMARY OF THE INVENTION

The invention combines with the laser type weapon simulator holographic means for producing a three dimensional virtual image of a target and detector screen means positioned substantially coincident with the target virtual image to provide three dimensional target and to visually indicate a score condition when the weapon is correctly aimed and fired. The invention contemplates both visual and infrared laser beam sources such that the device may also be used for sniper scope training. The invention further contemplates the use of holographic lens means and motion picture projector means plus means for moving a plurality of holograms to thereby provide potential movement in target and/or background scene.

DESCRIPTION OF THE PREFERRED EMBODIMENTS

Figure 1:
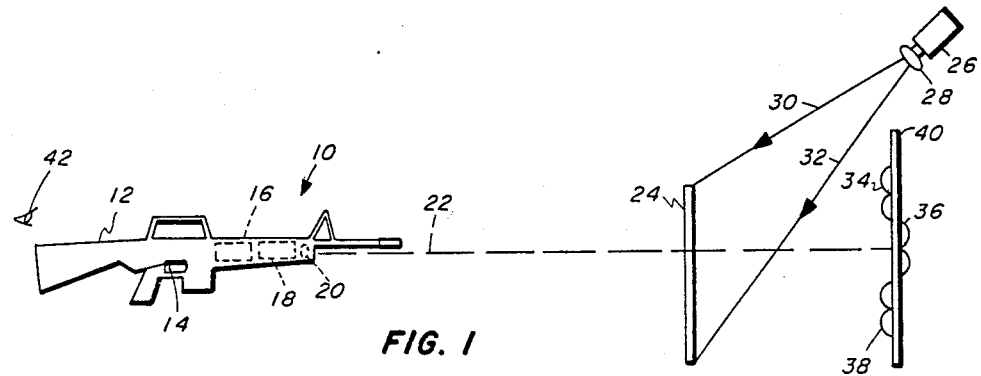
FIG. 1 is a schematic side view of a laser type weapon system utilizing holographic means and retroreflective target means and incorporating the invention.

In FIG. 1 of the drawing is shown a laser type weapon fire simulation system incorporating the invention.

A laser type weapon simulator indicated generally at 10 includes a weapon 12, trigger switch 14, power source 16, such as a battery or converter, a laser transmitter 18 and lens means 20 for projecting a laser beam 22 in the direction of fire of the weapon. Complete details on a suitable weapon are shown and described in U.S. Pat. No. 3,657,826 issued Apr. 25, 1972 to Albert H. Marshall et al. The laser, to provide a visible beam, can be of the helium neon type. To produce a three dimensional virtual image of a target a holographic means such as holographic plate 24 is positioned in the path of the beam 22 and a laser 26 with lens 28 is provided to pass image reconstruction beams, indicated by beams 30 and 32, to produce a three dimensional target image indicated by targets 34, 36 and 38 which are substantially coincident with a detector screen means indicated in FIG. 1 by a retroreflective screen 40.

In operation the laser type weapon simulator 10 is fired by actuating trigger switch 14, the weapon being aimed for the beam to hit the virtual image 34, 36 or 38. The laser beam 22 passes through the hologram 24 and impinges upon the retroreflective screen 40. The beam 22 then is reflected and returns to the eye 42 of the trainee along nearly the same path to indicate to the trainee where the simulated round has hit. The system has the advantage of realism in the creation and use of a three dimensional virtual image from a hologram employed in conjunction with a laser type weapon and detector screen means.

Figure 2:
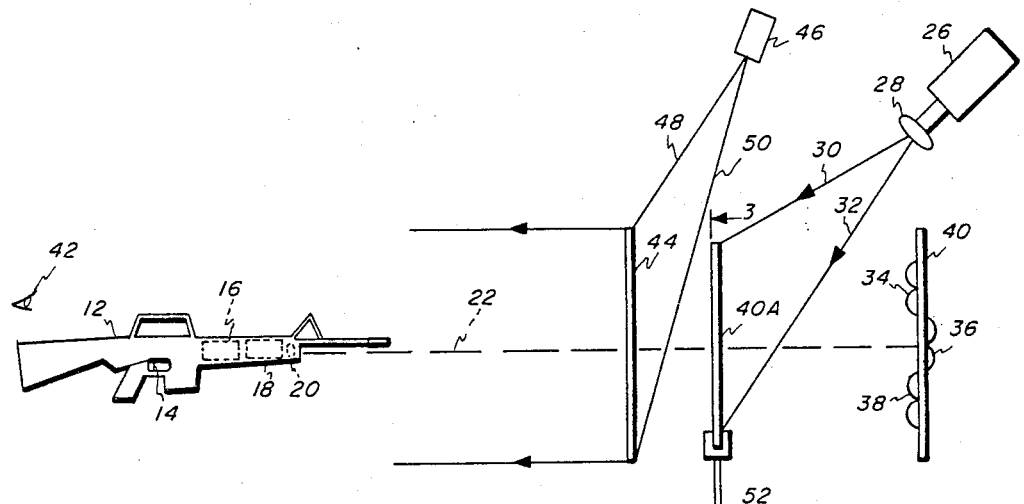
FIGS. 2 and 3 show side and plan views of the elements of FIG. 1 with additional means for providing target motion and/or target virtual image selection and holographic lens means.
Figure 3:
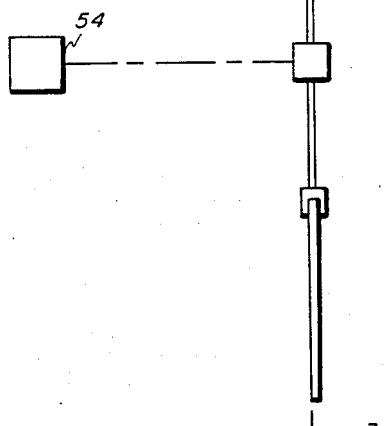
Figure 3:
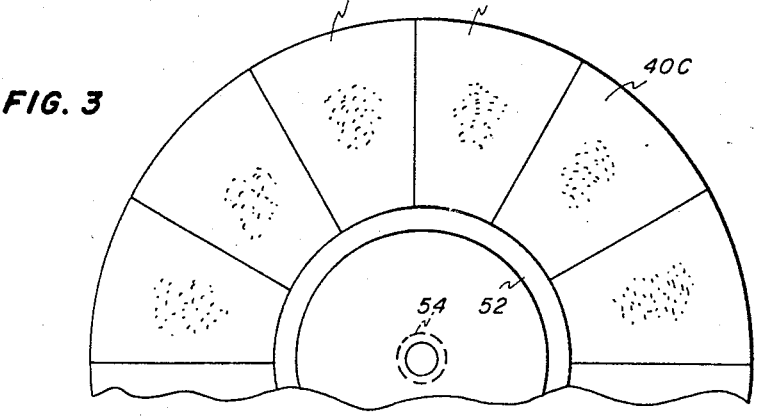

The invention also contemplates, as shown in FIGS. 2 and 3, the provision of a holographic lens 44 positioned in front of the detector screen 40 and an image projector 46 for projection background image rays 48, 50 to the lens 44 for redirection to the eyes of the trainee such that he will see both the images 34, 36, 38 and the background scene developed through lens 44 from projector 46. It is contemplated that the projector 46 may project a still picture or a motion picture for the background scene. It is further contemplated as shown in FIGS. 2 and 3 that the virtual image may be selectively changed or a series of holographic frames may be progressively moved into the laser beam path to present a moving three dimensional target image as well as a moving picture background.

In the case of FIGS. 2 and 3 the virtual image selection or motion is obtained in one way by having a plurality of holographic frames as for example 40A, 40B, 40C, etc. on the perimeter of a rotatable wheel 52 driven from a suitable stepped drive or continuous drive means represented by motor 54.

Figure 4:
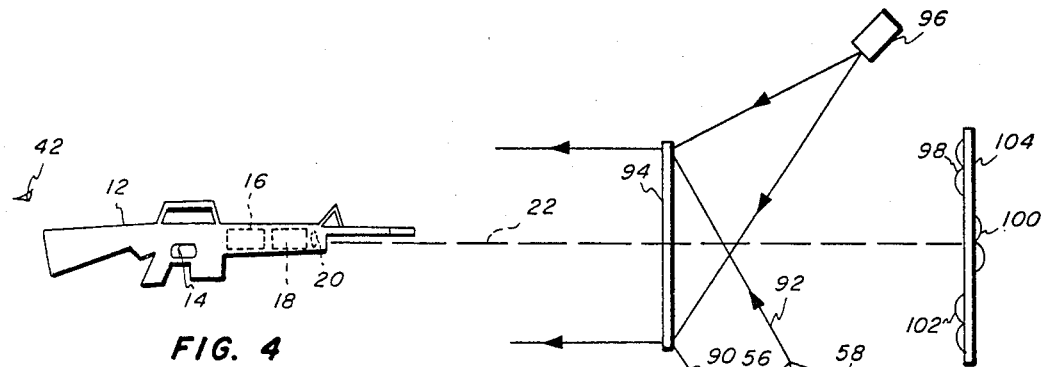
FIGS. 4 and 4A show side elevation and perspective views incorporating an alternative form of motion means for holographic plates.
Figure 4A:
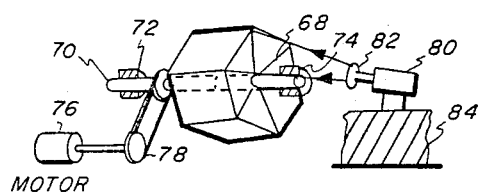

A modified form of the invention producing results equivalent to that described for FIGS. 2 and 3 is shown in FIGS. 4 and 4A. In the arrangement shown in FIGS. 4 and 4A a plurality of holograms 56, 58, 60, 62, 64 and 66 are mounted on a rotatable member 68, rotatable on shafts 70, fixed in bearings 72–74, from drive means exemplified by motor 76 and pulley-belt drive 78. A laser and lens means 80 and 82 are fixed as at 84 and project reconstruction beams 86, 88 to the hologram 56, in place at the moment, and pass a virtual image via rays 90, 92, and a holographic lens 94 back to the eye 42 of the trainee. At the same time the background projected image is passed through the lens 94 to the eye of the trainee from the projector 96. Again the trainee sees a virtual image 98, 100, 102 substantially coincident with detector screen 104.

Figure 5:
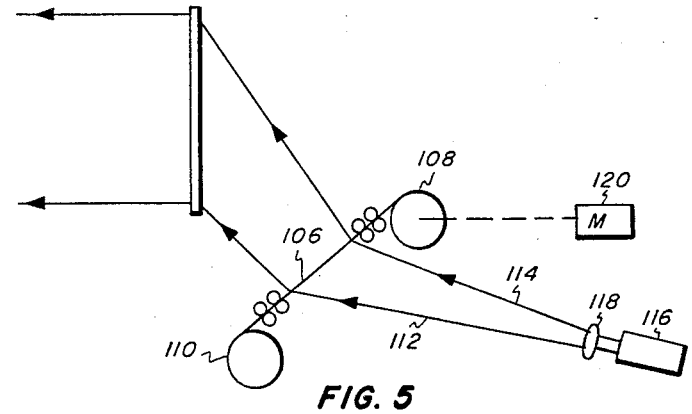
FIG. 5 is a schematic view showing the incorporation of a holographic film strip to provide target image motion.

It is contemplated further as shown in FIG. 5 that the holograms may be in the form of a film 106 comprising a plurality of holographic frames and rolled between reels 108 and 110. The reconstruction beams 112–114 are shown coming from the laser-lens combination 116, 118. Drive means such as motor 120 is provided for moving the film between the reels 108, 110.

The hologram or holograms can be made with a continuous wave laser, a pulsed laser, or synthetically generated holograms. The retroreflective screen can be any suitable reflective material, such as a beaded surface, which returns, i.e., redirects, the laser beam back to the eye of the trainee firing the weapon. The beam will also have sufficient spread such that an instructor standing close to the trainee can observe the hit or miss on the screen. Further, the detector screen could be one of a matrix of detectors positioned at the location of the holographic image for scoring.

Figure 6A:
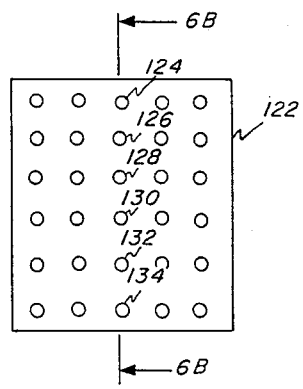
FIGS. 6A and 6B are front and side elevational views of a light sensor type detector screen and score indication counter used to explain a further modification of the invention.
Figure 6B:
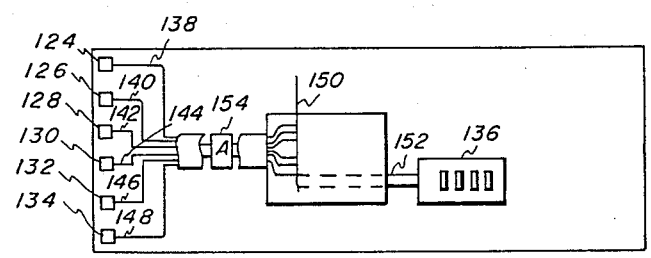

Thus, as shown in FIGS. 6A and 6B, the detector screen 122 can comprise a plurality of detectors 124, 126, 128, 130, 132, 134, etc. in a matrix form and electrically connected to an indicator means, such as hit counter 136 via connectors 138, 140, 142, 144, 146, 148, contact card 150 and cable 152. An amplifier means indicated by box 154 would be provided to boost the signal to a power necessary to actuate the counter 136.

In the above arrangement each card 150 may be different such that by replacing the card a different target location is provided. Thus, for one card the laser beam actuating detector 128 may actuate the counter 136 to indicate a hit. For another card the actuation of a different detector such as 124 may require actuation from the laser beam to actuate the counter. The selection of card would correspond to the desired virtual image to be projected and its location.

It is also contemplated in accordance with the invention that the laser weapon can include a laser of any wavelength dependent upon the application and arrangement. Thus, for the retroreflective screen to be viewed with the naked eye the laser means would be selected to produce a laser beam within a spectrum range visible to the naked eye.

Figure 7:
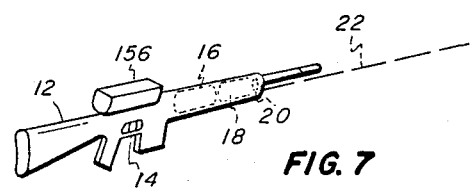
FIG. 7 is a perspective view of a modification of the laser type weapon to incorporate an infrared type laser and a sniper scope mounted on the rifle to permit viewing of hits from an infrared laser beam on a retroreflective target screen.

On the other hand, the invention is also useful in the training for night fire with a sniper scope viewer. Thus, as shown in FIG. 7 the weapon 10 may be provided with a sniper scope viewer 156 and with a laser of the gallium arsenide type to produce an infrared laser beam. In this embodiment, the hologram for providing the target, such as 24 in FIG. 1, would be an infrared hologram and the readout laser 26 would produce infrared reconstruction beams 30, 32. Thus, the trainee would "see" the infrared target and the infrared hit indication on his sniper scope.

It is contemplated further that the holographic means for producing a three dimensional virtual image of a target may in fact include a plurality of holographic frames for selective stacking one in front of another to produce a composite virtual image of additional apparent depth and improved realism.

Figure 8:
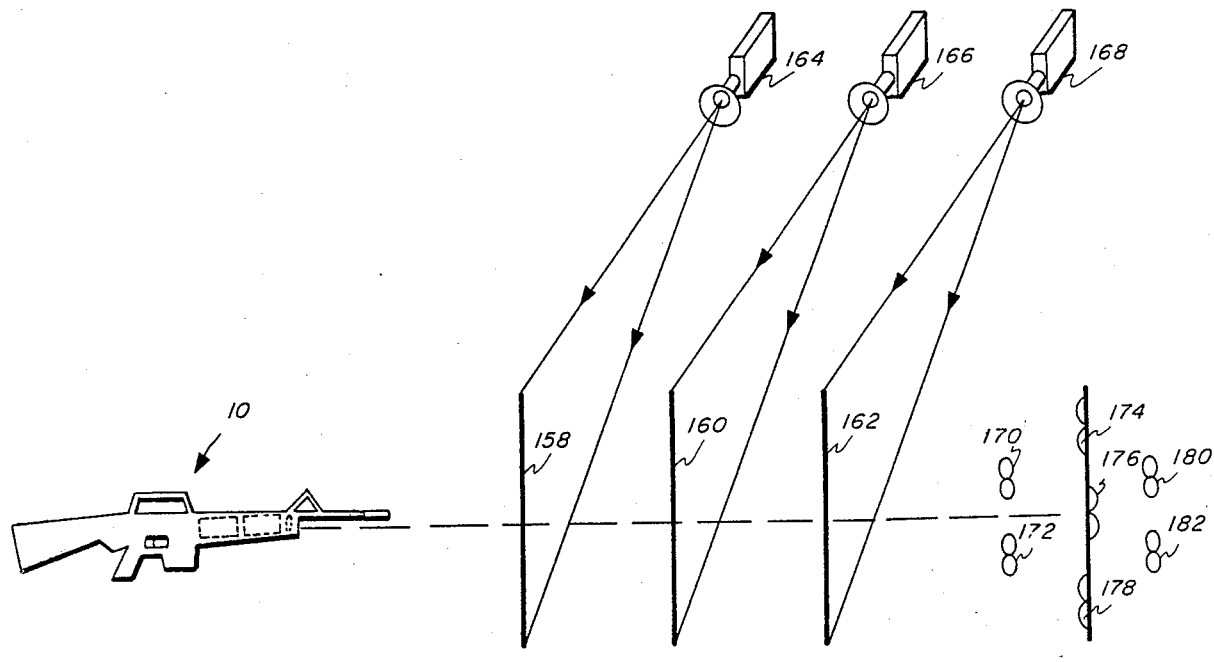
FIG. 8 is a schematic side view of a laser type weapon system in which a plurality of holograms are selectively stacked to provide a composite 3D virtual image.

An example of such an arrangement is shown in FIG. 8 wherein three holograms 158, 160 and 162 are provided and image reconstruction beams are received from the laser beam sources 164, 166 and 168 to form the respective image groups 170, 172; 174, 176, 178; and 180, 182. Thus, by varying the holographic frames, various composite 3-D images can be obtained and the composite image has greater apparent depth as indicated in FIG. 8.

It is apparent then that the invention can be used in various preferred modified forms and applications as described hereinbefore and that substitutions in details, materials and arrangements of parts may be made by those skilled in the art within the principal and scope of the invention as expressed in the appended claims.

What is claimed is:

1. A laser type weapon fire simulation system comprising:
   a. a laser type weapon simulator including a laser means, a power source and trigger switch means to produce a laser beam when said weapon is fired at a target in simulation;
   b. holographic means for producing a three dimensional virtual image of a target, and
   c. a retroreflective detector screen positioned substantially coincident with said target virtual image to provide a three dimensional target and to visually indicate by retroreflection of said laser beam a score condition when said weapon is actuated.

2. Apparatus according to claim 1 including
   a. an infrared type sniper scope for viewing said target,
   b. said laser means being of a type to produce a laser beam within a spectrum range in the infrared range to provide night type infrared gunnery training.

3. Apparatus according to claim 1 wherein
   a. said holographic means includes at least one holographic frame positioned in front of said reflective screen.

4. Apparatus according to claim 1 wherein
   a. said holographic means includes a plurality of holographic frames for selective stacking one in front of another to produce a composite virtual image.

5. Apparatus according to claim 4 wherein said holographic means includes also
   a. a holographic lens positioned in front of said detector screen, and
   b. a projector for passing a moving picture background scene to said holographic lens for view by the trainee through said lens to provide both a moving background scene and a three dimensional target image.

6. Apparatus according to claim 1 wherein
   a. said holographic means includes a plurality of holographic frames and means for moving said frames across the path of said laser beam in front of said screen to produce the effect of motion in the three dimensional virtual image of said target.

7. Apparatus according to claim 1 wherein said holographic means includes
   a. a holographic lens positioned in front of said retroflective screen,
   b. a plurality of holographic frames and means for sequentially moving said frames through a projection position c. laser means for reconstructing an image from each sequentially positioned frame and projecting the same to said holographic lens
d. said lens being selected to pass said reconstructed image to the eye of an observer adjacent said weapon, and
e. a projector and projector screen for passing a moving picture background scene to said holographic lens for view by the trainee through said lens to provide both a moving background scene and a variable three dimensional target image.

* * * * *